July 9, 1963     A. B. DYES     3,096,821

METHOD FOR INCREASING RECOVERY OF OIL

Filed May 31, 1960     6 Sheets-Sheet 1

INVENTOR.
Alvin B. Dyes

ATTEST
Charles F. Steininger

BY Robert E. Birch
Attorney

July 9, 1963

A. B. DYES 3,096,821

METHOD FOR INCREASING RECOVERY OF OIL

Filed May 31, 1960

ATTEST
Charles F. Steininger

INVENTOR.
Alvin B. Dyes
BY Robert E. Bisch
Attorney

United States Patent Office 3,096,821
Patented July 9, 1963

3,096,821
METHOD FOR INCREASING RECOVERY OF OIL
Alvin B. Dyes, Dallas, Tex., assignor to The Atlantic Refining Company, Philadelphia, Pa., a corporation of Pennsylvania
Filed May 31, 1960, Ser. No. 33,060
20 Claims. (Cl. 166—9)

The present invention relates to a method for increasing the recovery of oil from subterranean reservoirs. More specifically, this invention relates to an improved gas miscible displacement process for increasing the recovery of oil from a subterranean reservoir.

This application is a continuation-in-part of application Serial No. 462,592 filed October 15, 1954.

It has heretofore been proposed that substantially improved recovery of oil from a subterranean reservoir can be obtained by displacing the oil with one or more materials which are miscible with the oil and with one another under the operating conditions of temperature and pressure.

One such process involves the injection of unlimited amounts of normally gaseous hydrocarbons or other gases, which retain their gaseous state under operating conditions, into the reservoir at pressures sufficiently high to obtain miscibility between the reservoir oil and the injected gas. In this case, although the injected gas and the reservoir oil are not miscible with one another under ordinary conditions, applying a high enough pressure to the gas causes intermediate hydrocarbons such as butane, propane and ethane from the oil to mix with the gas at the zone of contact between the reservoir oil and the gas. By this transfer mechanism, a transition zone is formed such that the material at the leading edge of the transition zone is miscible with the reservoir oil, each increment of the transition zone is miscible with the material preceding it and the material following it, and the trailing end of the transition zone is miscible with the injected gas. The process is generally carried out at pressures in excess of about 3,000 p.s.i. and is restricted in its application to reservoirs which contain oil which is undersaturated with gas or which can be made undersaturated by the application of pressure. In this process, the composition of the injection gas is generally immaterial. For example, where natural gas is employed as the injection gas, a miscible pressure of about 3,500 p.s.i. may be necessary. On the other hand, one may also inject the so-called inert gases, such as nitrogen, air or flue gas, and obtain miscibility at a pressure only slightly higher than the miscible pressure for natural gas; for example, about 3,750 p.s.i. In addition, the miscibility pressure between the reservoir oil and the injected gas may be lowered if a gas which is miscible with reservoir oil at lower pressures than natural gas is injected. For example, if carbon dioxide is injected, a pressure of something less than 3,500 p.s.i. would be required to miscibly displace the reservoir oil. It is also obvious that a sequence of such gases could be injected with the first gas being one requiring the lowest pressure to attain miscibility with oil and the last gas being the one requiring the highest pressure to attain miscibility with oil. Processes of this character are described in detail in United States Patents No. 2,724,437 and No. 2,724,438 and copending application Serial No. 755,480 filed August 8, 1959, all assigned to a common assignee, and are generally known by the term "High Pressure Gas Process."

In another of the gas miscible displacement processes, as set forth in copending application Serial No. 352,985 filed May 4, 1953, assigned to a common assignee, a small amount of a fluid which is miscible with reservoir oil is injected into the reservoir followed by unlimited amounts of an ultimate displacing fluid under a pressure at which the ultimate driving fluid is also miscible with the oil-miscible fluid. It has been found in this process that the fluid first injected, or the oil-miscible fluid, need not exceed between 0.01 to 5 percent of the hydrocarbon pore volume of the reservoir in order to maintain the integrity of the slug throughout its traverse from an injection well to a production well. This process is known as the "Miscible Slug Process." In the species of the miscible slug process to which the present invention is directed, the ultimate displacing fluid is a gas which is immiscible with reservoir oil under the operating pressure, such as natural gas or any of the gases previously mentioned for use in the high pressure gas process. Suitable oil-soluble fluids include butane, propane, ethane, hydrogen sulfide, sulfur dioxide and mixtures of these materials. These oil-soluble fluids may also be injected in sequence, with the material which is miscible with the ultimate displacing fluid at the highest pressure being the first fluid and the material which is miscible with the ultimate displacing fluid at the lowest pressure being the last. When a sequence of fluids is employed, the total volume of the fluids injected need not exceed the previously stated amounts of a single oil-soluble fluid. As in the case of the high pressure gas process, the operating pressure will vary in accordance with the miscibility pressure between the oil-soluble fluid and the gas selected to drive such fluid; but, in general, the pressures required for the miscible slug process will be lower than those required for the high pressure gas process. For example, if liquid propane is the oil-soluble fluid and natural gas the ultimate driving fluid, a pressure of about 1,500 p.s.i. would be required.

Between these two processes, a third gas miscible displacement process exists in which a gaseous material, such as natural gas, is enriched with materials which are miscible with reservoir oil at lower pressures than natural gas. For example, natural gas with minor amounts of propane can be injected into the reservoir and miscibility can be attained at a pressure which is somewhat lower than that required for the high pressure gas process but somewhat above that required for the miscible slug process. In this particular case, any material which is miscible with oil at low pressures, such as the slug materials of the miscible slug process, may be mixed with any gas which would require a higher miscibility pressure, such as the gases specified for use in the high pressure gas process. As contrasted with the high pressure gas process, miscibility is obtained in this case by transfer of the enriching fluid from the gaseous mixture to the reservoir oil at the zone of contact between the gaseous mixture and the oil, thereby again building up a transition zone throughout which all fluids are miscible with the preceding and succeeding fluids with which they are in contact.

In the gas miscible displacement processes described above, the fact that miscibility between all driven and driving fluids is maintained makes these processes highly desirable in that substantially all of the reservoir oil will be displaced by the injected fluids in the volume of the reservoir contacted by the injected fluids. In other words, the unit displacement efficiency in the portion of the reservoir contacted by the displacing fluids is substantially one hundred percent. However, one serious drawback in all these processes is that only a small volume of the reservoir is contacted by the injected fluids. In short, in all of these processes, the volumetric displacement efficiency is only about forty to sixty-five percent before breakthrough of the injected fluids into the producing wells and this then represents the total recovery obtainable solely by miscible displacement (at one hundred percent unit displacement efficiency). After breakthrough of the injected fluids at the producing wells a small amount of additional oil will be recovered partly my miscible displacement and partly by immiscible displacement; but, in general, the total oil recovered by the miscible displacement plus that recovered after breakthrough is not enough better than that recoverable by a process having a low unit displacement efficiency and a high areal displacement efficiency, such as an ordinary waterflood, to be economically competitive with the latter.

It is, therefore, an object of the present invention to provide an improved method for displacing oil from subterranean reservoirs.

Another object of the present invention is to provide an improved gas miscible displacement process for the recovery of oil from a subterranean reservoir.

Still another object of the present invention is to improve the recovery of oil from a subterranean reservoir from which oil is displaced by one or more miscible fluids, the last of which is a gas at operating conditions of temperature and pressure.

A further object of the present invention is to improve the recovery of oil from a subterranean reservoir from which oil is displaced by the high pressure gas process.

A still further object of the present invention is to improve the recovery of oil from a subterranean reservoir from which oil is recovered by that species of the miscible slug process in which a gas is employed as the last of the miscible fluids.

Another and further object of the present invention is to increase the recovery of oil from a subterranean reservoir from which oil is displaced by a gas enriched with a fluid which is miscible with the oil at a lower pressure than such gas.

Another object of the present invention is to improve the volumetric sweep efficiency of an oil recovery process involving the displacement oil with one or more miscible fluids, the last of which is a gas at operating conditions of temperature and pressure.

These and other objects of the present invention will become apparent from the following detailed description when read in conjunction with the drawings, wherein.

Figure 1:
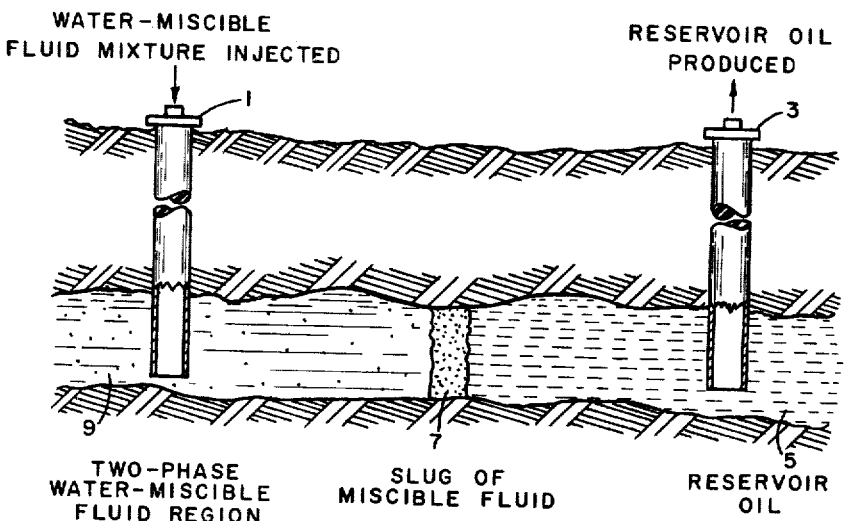
FIGURE 1 illustrates a subterranean oil reservoir after a portion of the oil has been displaced from the reservoir by a slug of miscible fluid followed by a water-miscible fluid mixture in accordance with the present invention.

As employed in the present specification, the following terms and phrases shall have the following meanings:

"Absolute permeability" shall mean the capacity of a porous medium to transmit a fluid therethrough when the porous medium is one hundred percent saturated with such fluid.

"Effective permeability" shall mean the capacity of a porous medium to transmit a fluid therethrough when the porous medium is partially saturated with such fluid and the remainder is saturated with another fluid.

"Relative permeability" shall mean the effective permeability of a porous medium to a fluid expressed as a percent or fraction of the absolute permeability of the medium to such fluid.

"Total pore volume" shall mean the bulk volume of a porous medium occupied by intercommunicating pore spaces which are filled with fluids in the virgin reservoir condition.

"Irreducible water" shall mean that volume of water which is left in a reservoir by a nonwetting phase passing through such reservoir when water is the wetting phase in such reservoir and, therefore, is nonflowable water under such conditions.

"Hydrocarbon pore volume" shall mean the total pore volume of a reservoir less the pore volume of the reservoir occupied by irreducible water.

"Gas miscible displacement process" shall mean a process for the displacement of oil from a subterranean reservoir involving the injection of one or more fluids under conditions such that each displacing fluid is miscible with the fluid it displaces and the last fluid is gaseous at the operating conditions, and shall include displacement of oil by a gas under pressure sufficient to render the oil and gas miscible at their zone of contact or by a small volume of an oil-miscible fluid followed by a gas under pressure sufficient to render the gas miscible with the oil-miscible fluid.

"Miscible fluid" shall mean a fluid which is a liquid or gas and is miscible with the fluid which it is displacing under the operating conditions of a gas miscible displacement process and shall include a flowing single phase of such fluid or part of a flowing two-phase mixture of such fluid with water. The term "miscible fluid" shall include the following previously mentioned fluids, without limitation: In the high pressure gas process, gases such as natural gas, nitrogen, air, flue gas and carbon dioxide; in the miscible slug process, liquids or gases such as butane, propane, ethane, hydrogen sulfide and sulfur dioxide; and, in the enriched gas drive process, gaseous mixtures of natural gas, nitrogen, air, flue gas and carbon dioxide, with small amounts of butane, propane, ethane, hydrogen sulfide and sulfur dioxide.

"Slug of miscible fluid" shall mean a small volume of a fluid which is gaseous at the operating pressure of a gas miscible displacement process, a small volume of a fluid which is liquid at the operating pressure of a gas miscible displacement process followed by a fluid which is gaseous at the operating pressure of such gas miscible displacement process or a small volume of a fluid which is liquid at the operating pressure of a gas miscible displacement process, and shall include a slug of gas in the high pressure gas or enriched high pressure gas processes, a slug of liquid in the miscible slug process and a slug of liquid followed by a slug of gas in the miscible slug process.

"Water-miscible fluid mixture" shall mean a two-phase mixture of water and one or more of the fluids coming within the definition of miscible fluid, set forth above, flowing simultaneously through the portion of the reservoir under consideration.

"Injection of a water-miscible fluid mixture" shall mean the injection into a reservoir of a mixture of water and miscible fluid or the alternate injection into a reservoir of small volumes of water and miscible fluid wherein the relative volumes of water and miscible fluid are such that mixing of the two takes place in the reservoir during travel of water and miscible fluid through the reservoir from the injection well to the production well.

"Reservoir volume of free gas" shall mean the volume of free gas present in a two-phase, water-gas region of an underground reservoir over and above the volume of gas necessary to saturate water with such gas at the operating pressure of a gas miscible displacement process.

"Breakthrough" shall mean that stage of a gas miscible displacement process at which the first increment of miscible fluid reaches the producing well.

"Breakthrough volume of oil produced" shall mean the cumulative volume of oil produced as a result of the operation of a gas miscible displacement process prior to breakthrough.

"Gas saturation established" and "water saturation established" shall mean the fraction of the hydrocarbon pore volume of a reservoir occupied by gas and water, respectively, in the two-phase, water-gas region of the reservoir.

"Initial water saturation" shall mean the fraction of the hydrocarbon pore volume of a reservoir occupied by water prior to initiation of the gas miscible displacement process.

"Residual water saturation" shall mean the fraction of the hydrocarbon pore volume of a reservoir occupied by water in the oil bank and in the swept region of the reservoir during the operation of a gas miscible displacement process in such reservoir.

In accordance with the present invention, it has been found that the cumulative oil recovered by a gas miscible displacement process can be substantially increased by injecting into and concurrently flowing through an oil reservoir a mixture of water and miscible fluid in critical proportions. In one major aspect of the present invention, the ratio of water to miscible fluid in the injected mixture is selected so that the two materials flow through the two-phase, water-miscible fluid region of the reservoir at equal velocities. In another aspect of the present invention, the ratio of water to miscible fluid in the injected mixture is such that the miscible fluid flows through the two-phase, water-miscible fluid region of the reservoir at a velocity greater than the velocity of the water, thereby emitting miscible fluid from the mixture at the leading end and building up a bank of miscible fluid of preselected size below, a critical volume ahead of the two-phase, water-miscible fluid region. In a third variation of the present invention, a slug of miscible fluid of preselected size below a critical volume is injected into the reservoir followed by a mixture of water and the miscible fluid in proportions such that the water flows through the two-phase, water-miscible fluid region of the reservoir at a velocity greater than the velocity of the miscible fluid but less than that velocity which will reduce the slug of miscible fluid to zero and build up a single-phase bank of water ahead of the two-phase region prior to breakthrough, thereby diminishing the size of the slug of miscible fluid.

Referring specifically to FIGURE 1 of the drawings, this figure shows a vertical section of an underground oil reservoir, penetrated by an injection well 1 and a production well 3, at a stage in the practice of the present invention at which approximately half of the reservoir has been swept clear of the oil originally present therein. In the reservoir depicted, oil 5 occupies the unswept portion of the reservoir, a slug of miscible fluid 7 occupies a part of the swept portion of the reservoir and is displacing the oil 5 and a two-phase mixture of water and miscible fluid 9 is concurrently flowing through the remaining part of the swept portion of the reservoir and is displacing the slug of miscible fluid 7. It should be recognized that FIGURE 1 depicts those variations of the present invention in which a slug of miscible fluid is injected prior to the injection of the water-miscible fluid mixture or in which miscible fluid has been emitted from the water-miscible fluid mixture, thereby building up a band of miscible fluid ahead of the water-miscible fluid mixture and thus creating the slug of miscible fluid in situ. However, as will become apparent from the following discussion of the present invention, the slug of miscible fluid 7 may not be present in the reservoir at the depicted stage of displacement when other variations of the invention are practiced. In the latter cases, water-miscible fluid mixture 9 will be in direct contact with oil 5, subject to certain limitations hereinafter discussed.

In order to simplify the detailed description of the present invention which follows, FIGURES 2, 3, 6 and 7 of the drawings illustrate a case in which the slug of miscible fluid and the miscible fluid in the water-miscible fluid mixture is a gas throughout. However, it should be recognized, as will be pointed out hereinafter, that the same principles and relationships illustrated apply to situations in which a liquid makes up all or part of the slug of miscible fluid or a part of the water-miscible fluid mixture.

Figure 2:
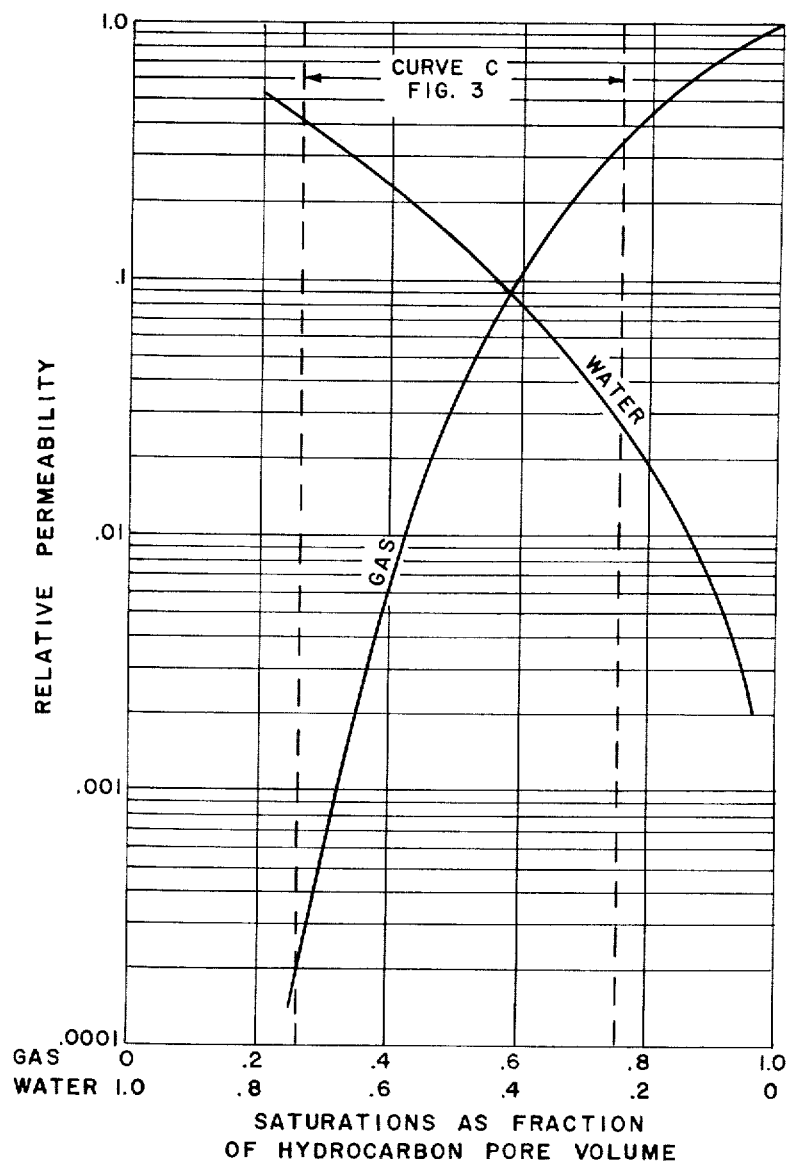
FIGURE 2 is a plot of relative permeability to water and relative permeability to gas versus gas and water saturations in a two-phase, water-gas region of a specific reservoir.

FIGURE 2 is a plot of relative permeability to water and relative permeability to gas versus gas saturation and water saturation in the two-phase, water-gas region of a specific reservoir, herein designated reservoir C, as at a point in two-phase region 9 of FIGURE 1. In FIGURE 2, the relative permeabilities are expressed as a fraction of the absolute permeability of the reservoir, the gas and water saturations are expressed as a fraction of the hydrocarbon pore volume of the reservoir and water is the wetting phase and gas the nonwetting phase in the reservoir. Both the relative permeabilities and the hydrocarbon pore volume of a reservoir can be determined with sufficient accuracy by methods well known to those skilled in the art. For example, the relative permeabilities may be determined in accordance with the method outlined in "Relative Permeability Measurements on Small Core Samples," by R. A. Morse, P. L. Terwilliger and S. T. Yuster, Producers Monthly, vol. 11, pages 19–25. It should also be recognized that the relative permeabilities can be plotted against total pore volume or any other expression of porosity.

Utilizing the relative permeability data of FIGURE 2, one can determine the volumetric flow rate of water, the volumetric flow rate of gas and the ratio of the volumetric flow rate of water to the volumetric flow rate of gas through the two-phase, water-gas region of a particular reservoir, such as reservoir C, at specific water and gas saturations from the following formulas:

Volume of water flow $$\simeq \frac{k_{r_w} \text{ (relative permeability to water)}}{\mu_w \text{ (viscosity of water)}} \quad (1)$$

$$\text{Volume of gas flow} \simeq \frac{k_{r_g} \text{ (relative permeability to gas)}}{\mu_g \text{ (viscosity of gas)}} \quad (2)$$

$$\frac{\text{Volume of water flow}}{\text{Volume of gas flow}} = \frac{k_{r_w}}{\mu_w} \times \frac{\mu_g}{k_{r_g}} \quad (3)$$

For various water and gas saturations, the ratio of the volume of water flow to the volume of gas flow can then be plotted for reservoir C as shown by curve C of FIG- URE 3. For example, utilizing a water viscosity of 0.5 cps. and a gas viscosity of 0.02 cps., assuming a water saturation of sixty percent and a gas saturation of forty percent, and reading a relative permeability to water of 0.23 and a relative permeability to gas of 0.00615 from the original data of FIGURE 2, one would calculate a ratio of volume of water flow to volume of gas flow of 1.5 and plot this value as one point of curve C of FIGURE 3. Similarly, at a water saturation of fifty percent and a gas saturation of fifty percent, the relative permeabilities to water and gas are 0.14 and 0.035, respectively, and the volume of water flow to the volume of gas flow is 0.16. It should be recognized that a particular ratio of volume of water flow to volume of gas flow through a particular reservoir also represents the ratio of the volume of water injected to the volume of gas injected. Curves for other reservoirs can be similarly plotted, as shown by curves A, B, D and E of FIGURE 3, from relative permeability data for such reservoirs (not shown). Reservoir curves A and E generally represent the most extreme cases which would be encountered in actual practice.

The injection and flow through a reservoir of a selected ratio of water to gas will establish in the reservoir a particular water saturation and a particular gas saturation. In other words, irrespective of whether water and gas are flowing at equal velocities through the two-phase, water-gas region, gas is flowing faster than water in the water-gas region or water is flowing faster than gas in the water-gas region, the injection into and flow through a particular reservoir of a specified ratio of water to gas will establish a particular water saturation and a particular gas saturation when these saturations become stabilized or reach what may be termed an equilibrium condition. For example, the injection into and flow through reservoir C of 1.5 volumes of water to 1.0 volume of free gas will establish a water saturation of sixty percent and a gas saturation of forty percent, and the injection of 0.16 volume of water to 1.0 volume of free gas will establish a water saturation of fifty percent and a gas saturation of fifty percent.

Having the volume of water flow and the volume of gas flow through the two-phase, water-gas region of a reservoir, one may determine the linear velocity of water through the water-gas region and the linear velocity of gas through the water-gas region, since the linear velocity of a fluid is proportional to its volumetric flow rate divided by the fraction of the pore space which it must occupy in the two-phase region of the reservoir. Thus, $$\text{Velocity of water} \cong \frac{\text{Volume of water flow} \left(\frac{k_{r_w}}{\mu_w}\right)}{\text{Water saturation } (S_w)} \quad (4)$$

$$\text{Velocity of gas} \cong \frac{\text{Volume of gas flow} \left(\frac{k_{r_g}}{\mu_g}\right)}{\text{Gas saturation } (S_g)} \quad (5)$$

With these relationships in mind, it is obvious that if one wants the two phases to flow at equal velocities and neither water nor gas to flow ahead of the two-phase region then, $$\frac{k_{r_w}}{\mu_w}\bigg/\frac{k_{r_g}}{\mu_g} \text{ must} = \frac{S_w}{S_g} \quad (6)$$

Figure 3:
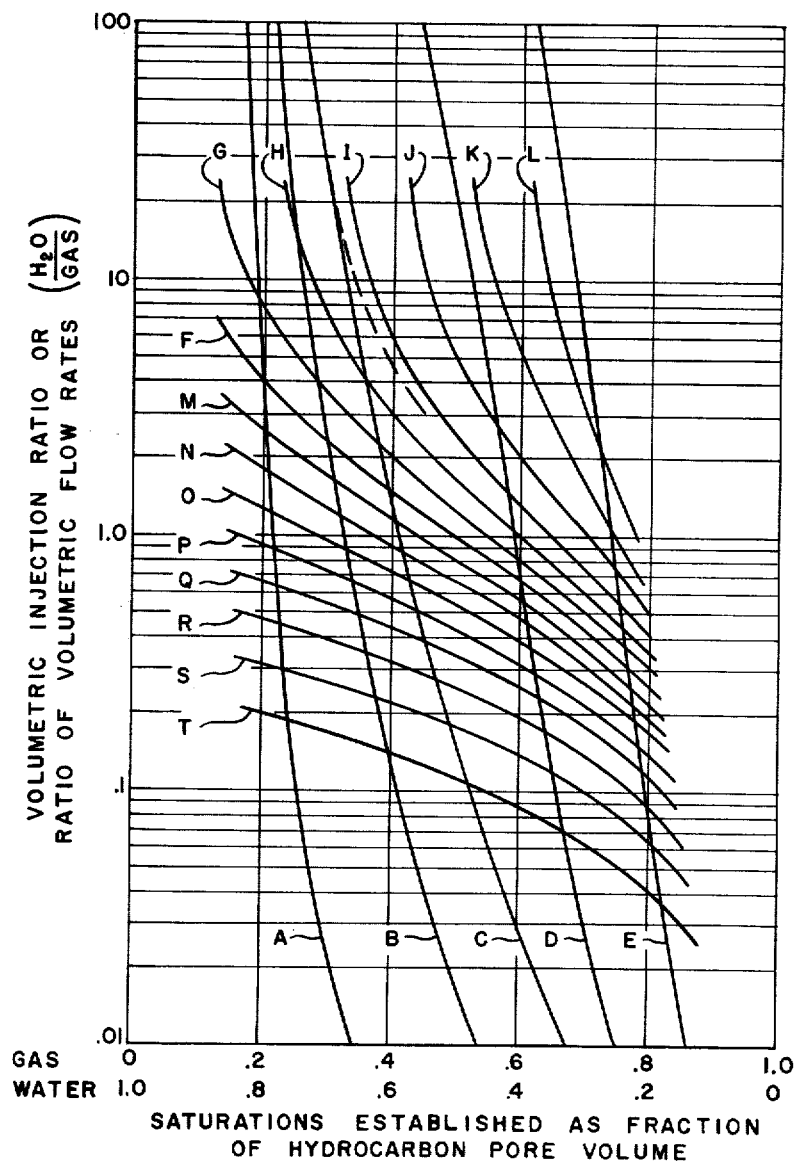
FIGURE 3 is a plot of ratio of volumetric flow rates or volumetric injection ratio of water to gas versus water and gas saturations established in a plurality of two-phase, water-gas regions of different reservoirs having no residual water present therein.

In other words, when the ratio of the volume of water flow to the volume of gas flow (or the ratio of the volume of water injected to the volume of gas injected) is equal to the ratio of water saturation to gas saturation established in the two-phase, water-gas region the two phases will flow at equal velocities and neither water nor gas is emitted ahead of the two-phase, water-gas region. Obviously, the injection ratio necessary to have water and gas flow at equal velocities through a two-phase, water-gas region of a reservoir can be calculated by trial and error utilizing Formula 6. Each reservoir will have a particular equal velocity injection ratio and such ratios for reservoirs A, B, C, D and E are shown in FIGURE 3 as the crossover points of reservoir curves A, B, C, D and E by the equal velocity curve F. For example, to obtain equal velocity flow in reservoir C, one must inject into and flow through the reservoir a ratio of 1.5 volumes of water to 1.0 volume of free gas.

Figure 4:
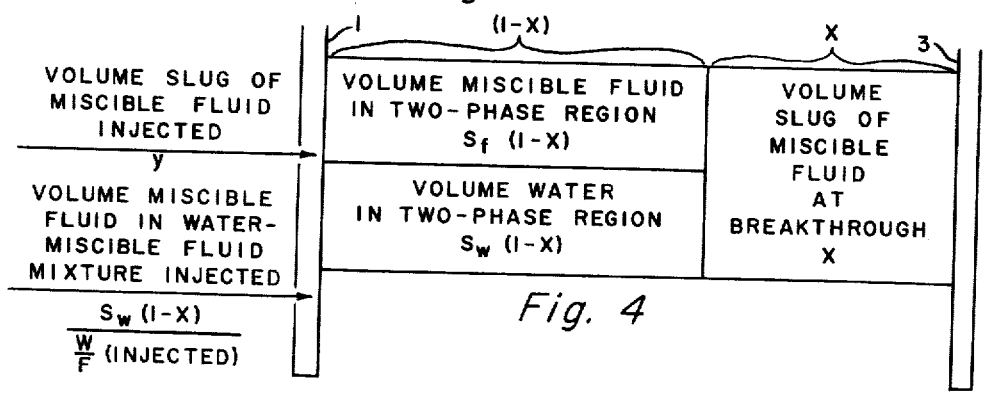
FIGURE 4 is a pictorial representation of a vertical section of an underground reservoir having no residual water present therein and showing the materials contained in the reservoir at breakthrough of the first increment of miscible fluid at the producing well when the present invention is practiced.

The equal velocity crossover points of reservoir curves A, B, C, D and E by curve F, as well as other conditions which may be brought about by the injection of other ratios of water to gas, may also be calculated by the solution of a simple material balance equation. FIGURE 4 of the drawings pictorially shows a vertical linear section of a reservoir with the fluids contained therein at breakthrough and the materials injected in order to bring about this breakthrough condition. In FIGURE 4, the area $x$ represents the volume of the reservoir occupied by a slug of miscible fluid ahead of the two-phase, water-miscible fluid region and area $(1-x)$ represents the volume of the reservoir occupied by the two-phase, water-miscible fluid region, both at breakthrough. The volume of the miscible fluid $x$ may be made up of miscible fluid $(y)$ injected prior to the water-miscible fluid mixture or miscible fluid from the injected water-miscible fluid mixture $$\left[\frac{S_w(1-x)}{W/F}\right]$$

where $S_w$ is the water saturation established and $W/F$ is the ratio of water to miscible fluid injected] or both. Similarly, the volume of miscible fluid in the two-phase region $[S_f(1-x)$ were $S_f$ is the miscible fluid saturation established] may be made up of miscible fluid from the water-miscible fluid mixture injected or miscible fluid from both preinjected miscible fluid and the injected water-miscible fluid mixture. A miscible fluid material balance for this reservoir may be written as follows:

$$1(x) + S_f(1-x) = 1(y) + \frac{S_w(1-x)}{W/F} \quad (7)$$

If no miscible fluid is injected prior to the water-miscible fluid mixture $(y=0)$ and we want the two phases to flow at equal velocities (with neither miscible fluid nor water building up ahead of the two-phase region or $x=0$), then Formula 7 will reduce to $$\frac{S_w}{S_f} = W/F \quad (8)$$

or the crossover point of a reservoir curve and equal velocity curve F of FIGURE 3. Similarly, if we inject a specified percent of miscible fluid $(y)$ prior to the water-miscible fluid mixture and we want to maintain that same size slug of miscible fluid up to breakthrough (neither adding to it nor diminishing it or $x=y$) we would again want equal velocity flow of the two phases and Formula 7 would reduce to Formula 8. To illustrate, for reservoir C, if $y=0$ and we select various injection ratios of water to gas from curve C of FIGURE 3, we can solve Equation 7 for $x$ and by trial and error determine the injection ratio at which $x=0$. Thus, an injection ratio of 1.5 volumes of water to 1.0 volume of gas will establish a water saturation of 0.60 and a gas saturation of 0.40 (curve C). Substituting these values in Formula 7 with $y=0$ will result in $x=0$. Also the injection of a ten percent slug of miscible fluid $(y=.10)$ prior to the injection of 1.5 volumes of water to 1.0 volume of gas will result in $x=.10$.

Obviously, if we inject a ratio of water to miscible fluid greater than the equal velocity ratio, water will flow ahead of the two-phase, water-miscible fluid region. This situation is not preferred practice if no slug of miscible fluid is injected prior to the water-miscible fluid mixture since water flowing into the oil phase will reduce the benefits obtained by the injection of the water-miscible fluid mixture. However, if a sufficient volume of miscible fluid is injected prior to the water-miscible fluid mixture, water may be permitted to flow faster than miscible fluid in the water-miscible fluid region and dissipate the slug of miscible fluid into a two-phase region provided the water-miscible fluid injection ratio is no higher than that which will just reduce the volume of the slug of miscible fluid to zero at breakthrough. The water-miscible fluid injection ratios which will just reduce a particular size miscible slug to zero at breakthrough can also be calculated by trial and error solution of Formula 7. In this case, $y$ will equal the percent miscible fluid slug injected and we would solve Equation 7 for various water-miscible fluid injection ratios until an injection ratio is found at which $x=0$. If a ten percent gas slug is injected in reservoir C this ratio is 2.215 volumes of water to 1.0 volume of gas. Therefore, if a ten percent gas slug is injected in reservoir C we may then inject water-gas at a ratio of 1.5 to 1 and the ten percent gas slug will remain intact until breakthrough or a ratio of 2.215 to 1 and the ten percent gas slug will be reduced to 0 at breakthrough. Between these two injection ratios a gas slug between 0 and 10 percent will be left at breakthrough. The crossover point of curve C and curve G of FIGURE 3 represents the injection ratio of 2.215 to 1 which will reduce a ten percent gas slug to zero at breakthrough. Similar points on reservoir curves A, B, D and E may be calculated for the complete dissipation of a ten percent slug of gas in such reservoirs. In like manner, injection ratios for the complete dissipation of gas slugs equal to twenty percent, thirty percent, forthy percent, fifty percent and sixty percent can be calculated and their respective crossovers of the reservoir curves plotted as illustrated by curves H, I, J, K and L. The fact that some of these gas slug curves do not cross certain reservoir curves simply means that, in that particular reservoir, the gas slug in question can only be partially dissipated irrespective of the ratio of water to gas injected. Stated differently, there is a certain maximum gas saturation which can be established in the two-phase, water-gas region of the reservoir in question (dependent upon the reservoir rock properties) and when that maximum value is established the water-gas region can absorb no more gas from the pre-injected gas slug and, consequently, the gas slug cannot be reduced to 0. For example, in reservoir C, the maximum gas saturation which can be established in the water-gas region is about twenty-seven percent gas. Therefore, at that water-gas injection ratio at which a gas slug curve of twenty-seven percent (shown dashed in FIGURE 3) is tangent to curve C (approximately 23.3 volumes of water to 1 volume of gas) as twenty-seven percent slug of gas will be completely dissipated at breakthrough. Also, if we inject a gas slug of, say, forty percent, an injection ratio of about 23.3 to 1 will leave a gas slug of about 17.8 percent at breakthrough. Further material balance calculations show that, irrespective of how much larger the ratio of water to gas injected might be, the forty percent slug will never be dissipated below the previously mentioned value of 17.8 percent. The maximum depletion of any slug greater than twenty-seven percent also occurs at 23.3 to 1 or higher.

It is also clear that, if water to miscible fluid ratios below the equal velocity ratio are injected, miscible fluid will flow ahead of the two-phase, water-miscible fluid region and form a miscible fluid bank or slug. This situation is desirable and forms a second variation of the present invention, since in this case we need not inject a miscible fluid slug prior to the water-miscible fluid mixture but can depend upon the water-miscible fluid mixture to build up a miscible fluid slug and thus create a slug of miscible fluid in situ. The water to miscible fluid injection ratios necessary to build up various preselected miscible fluid slugs at breakthrough can also be calculated by Formula 7. In this situation no miscible fluid slug is preinjected ($y=0$) and we can select various water to miscible fluid injection ratios and solve Equation 7 for $x$ until $x$ equals the size of the miscible fluid slug desired. Referring again to reservoir C of FIGURE 3, if we wish to build up a ten percent gas slug at breakthrough we would inject a water-gas ratio of 1.13 volumes of water to 1 volume of gas. This point is illustrated in FIGURE 3 by the crossover of curve C and curve M. By the same token the cross overs of curve M and curves A, B, D and E represent the injection ratios necessary to build up a ten percent gas slug in each of these reservoirs. Curves N, O, P, Q, R, S and T represent the ratios which must be injected to build up gas slugs of twenty percent, thirty percent, forty percent, fifty percent, sixty percent, seventy percent and eighty percent in the respective reservoirs.

From what has been said above, it is clear that one may also inject a small slug of miscible fluid prior to the water-miscible fluid mixture and thereafter inject a water-miscible fluid mixture in proportions such that the miscible fluid flowing at a greater velocity than water will add to the initial slug of miscible fluid and build it up to a preselected larger value at breakthrough. The injection ratios necessary to accomplish the desired result in this variation can also be determined by trial and error solution of Formula 7 by assuming various injection ratios.

Figure 5:
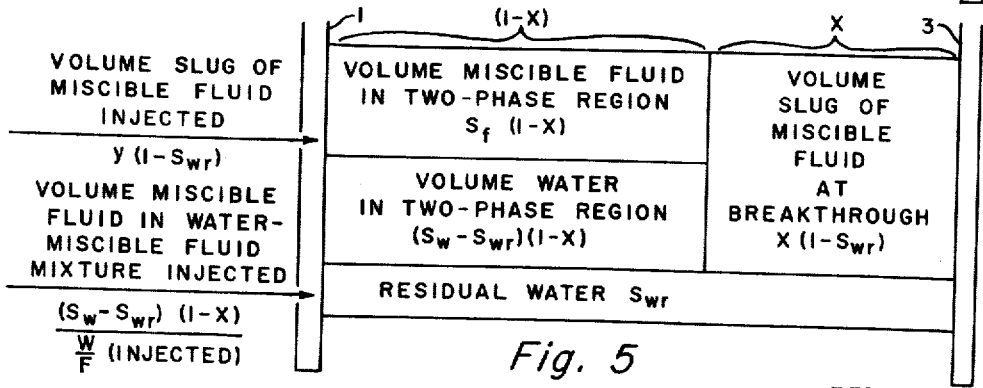
FIGURE 5 is a pictorial representation of a vertical section of a reservoir similar to that of FIGURE 4 except that the reservoir of FIGURE 5 contains residual water.

As can be seen from FIGURE 4 the reservoirs which we have been discussing up to this point contain no residual water (no water above irreducible water). Accordingly, curves F, G, H, I, J, K, L, M, N, O, P, Q, R, S and T of FIGURE 3 represent equal velocity injection ratios, injection ratios to completely dissipate a gas slug and injection ratios to build up a gas slug in each of the reservoirs when those reservoirs contain no initial water saturation at the time the treatment is begun and, consequently, no residual water saturation. However, the gas miscible displacement processes referred to herein are equally applicable to watered out or partially watered out reservoirs, i.e., reservoirs which have been waterflooded. After waterflooding, such reservoirs contain a substantial amount of water above the amount of irreducible water and, therefore, have an initial water saturation at the time the application of the gas miscible displacement process is begun. When the gas miscible displacement process is begun, the oil in the reservoir is miscibly displaced and builds up a bank of oil ahead of the miscible fluid or fluids. This oil bank displaces oil ahead of it and part of the water initially present so that a lesser volume of water or a residual water saturation above irreducible water but equal to or below the initial water saturation is present in the oil bank and in the swept region of the reservoir behind the oil bank. The residual water saturation present in the miscible fluid region and in the two-phase, water-miscible fluid region is slightly less than that in the oil bank and changes slightly as the displacement progresses. However, for all practical purposes and for all practical calculations this change can be ignored. Therefore, as a practical matter, the residual water saturation in the swept region of the reservoir is the same as the residual water saturation in the oil bank, which value can be determined experimentally in the laboratory or mathematically according to well known procedures. Further, although such residual water flows in the two-phase, water-miscible fluid region of the reservoir, it does not affect the relative volumetric flow rate of water and miscible fluid or the velocities of flow of water and miscible fluid and, therefore, can be considered nonflowable. However, since a portion of the original hydrocarbon pore volume of the reservoir is now filled with residual water we must take this into account in all calculations having to do with injection ratios of water to miscible fluid. FIGURE 5 of the drawings pictorially shows a reservoir in the same manner as FIGURE 4 but having a residual water saturation ($S_{wr}$). Based on FIGURE 5 one may again write a miscible fluid material balance for the reservoir.

$$x(1-S_{wr})+S_f(1-x)=y(1-S_{wr})+\frac{(S_w-S_{wr})(1-x)}{W/F} \quad (9)$$

Figure 6:
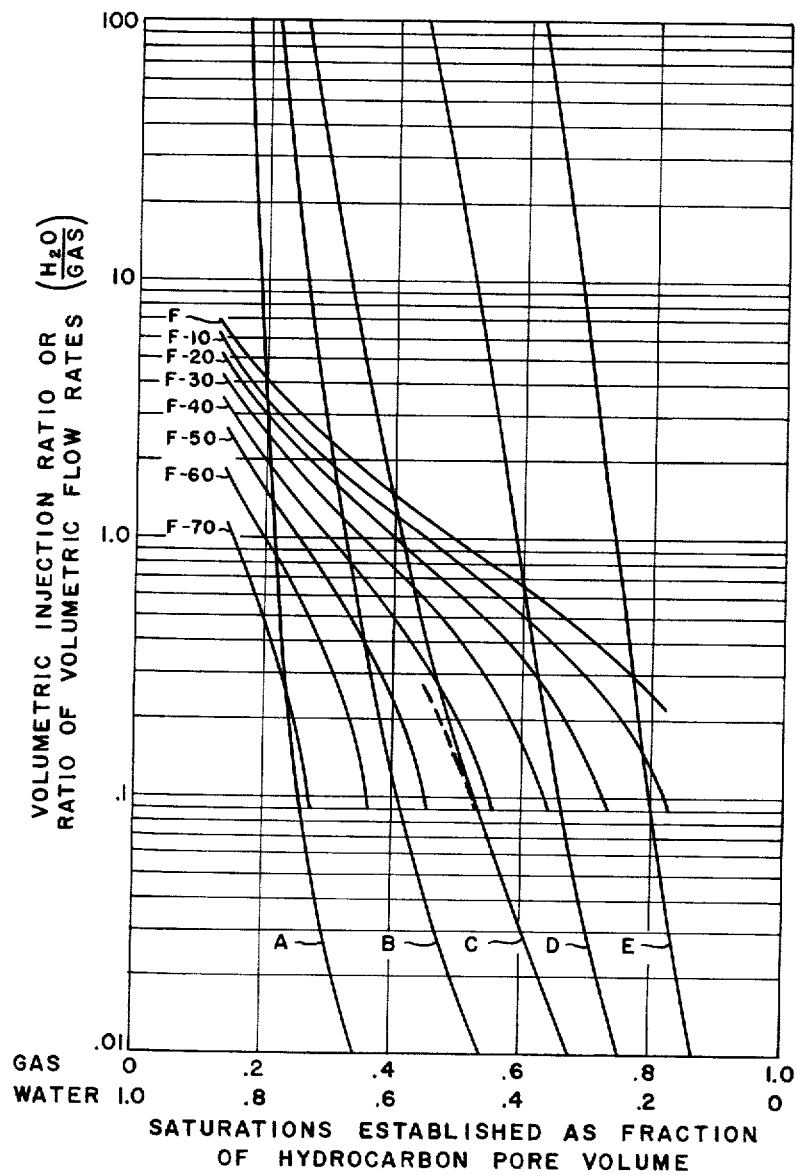
FIGURE 6 is a plot having the same coordinates and showing the same reservoir curves as FIGURE 3, but in which equal velocity injection ratios are shown for these reservoirs having various residual water saturations.
Figure 7:
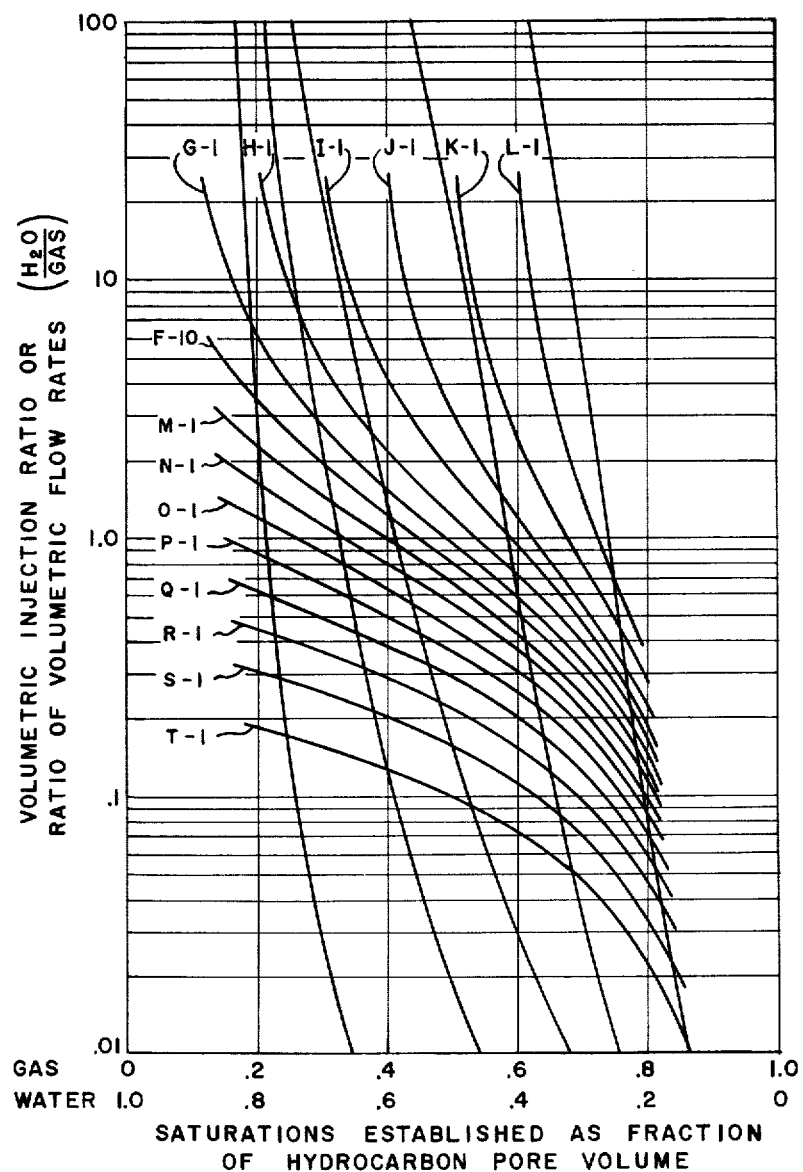
FIGURE 7 is a plot similar to FIGURE 3 except that the various reservoirs are assumed to contain ten percent residual water saturation.

It should be recognized that Equation 9 reduces to Equation 7 if $S_{wr}=0$. Assuming a particular residual water saturation in a reservoir and various ratios of water to miscible fluid injected into the reservoir, one can by trial and error solve Equation 9 for equal velocity flow of water and miscible fluid through the two-phase region ($x=0$). For example, in reservoir C, if we have a residual water saturation of ten percent, we find that the equal velocity ratio of water to gas which must be injected is 1.22 volumes of water to 1.0 volume of gas. It is to be noted that the equal velocity injection ratio in this case is less than the equal velocity ratio (1.5 to 1) for the situation where no residual water saturation existed in the reservoir (FIGURE 3). If we now calculate the equal velocity injection ratios for reservoirs A, B, D and E having a ten percent residual water saturation and plot the crossover points, we arrive at a new equal velocity curve F −10 as shown in FIGURE 6. Similar equal velocity curves F −20, F −30, F −40, F −50, F −60 and F −70 may be plotted for twenty percent, thirty percent, forty percent, fifty percent, sixty percent and seventy percent residual water saturations. It is to be noted in FIGURE 6 that certain of the equal velocity curves do not cross some of the reservoir curves. This simply means that in the reservoir in question (dependent upon the reservoir rock properties) there is a certain maximum residual water saturation which can be established and the water saturation in question is above that maximum. Also, at the maximum residual water saturation equal velocity flow of water and gas can barely be attained and a gas slug cannot be built up at any injection ratio. For example, in reservoir C we can never attain equal velocity flow or build up a gas slug in reservoir C at a residual water saturation above about 42.84 percent. This is shown by the dashed curve of FIGURE 6. Each of these new equal velocity curves, or an equal velocity curve for the actual residual water saturation determined, will, therefore, have a new family of curves for dissipation and build up of various size gas slugs similar to gas slug curves G, H, I, J, K, L, M, N, O, P, Q, R, S and T of FIGURE 3 but shifted by various amounts due to the presence of the residual water. Such a family of curves may be plotted by trial and error solution of Equation 9 and such curves are shown in FIGURE 7 for reservoirs A, B, C, D and E having a ten percent residual water saturation.

With an understanding of the basic principles applicable to the operation of the present invention which are discussed above, it is obvious that there are many ways in which the present invention can be practiced. However, there are three basic variations from which one skilled in the art will recognize that a number of modifications can be developed. In order to define the critical limits for the ratio of water to miscible fluid injected for any specific situation in any specific reservoir, Formula 9, previously set forth, should be used.

In the first variation of the present invention, the water-miscible fluid mixture is injected in proportions such that the water and miscible fluid will flow at equal velocities through the two-phase, water-miscible fluid region of the reservoir. In order to obtain equal velocity flow of the two phases, one would select different water-to-miscible fluid injection ratios and solve Equation 9 by trial and error until $x$ equal $y$. If $y$ is 0, that is, no slug of miscible fluid is injected prior to the water-miscible fluid mixture, then $x$ will also equal 0. The situation where both $x$ and $y$ are equal to 0 can be practiced in any of the gas miscible displacement processes previously discussed. When using one of the gaseous fluids conventionally employed in the high pressure gas process or one of such gaseous fluids enriched with a fluid which is miscible with oil at lower pressures than such gas, the high pressure gas or enriched gas would be included in a water-gas mixture and injected into a reservoir at the equal velocity ratio. Thus, the water-gas region will be in direct contact with the reservoir oil. The benefits of the present invention will be obtained under these conditions so long as the gas in the water-gas mixture is in contact with the oil under a pressure sufficient to render such gas miscible with the oil. Similarly, if that version of the miscible slug process in which a gas is the ultimate displacing fluid is practiced, a two-phase mixture of water and oil-soluble liquid will be injected at a ratio such that the oil-soluble liquid and water flow at equal velocities, and this mixture would be followed by a mixture of gas and water in proportions such that equal velocity flow will be attained. Again, if equal velocities are maintained, water will not flow ahead of either two-phase region and the maximum benefits of the present invention will be attained. It should be recognized in connection with this last variation that the relative permeability data for a two-phase region of a hydrocarbon, oil-soluble liquid, such as propane, and water will be the same as that for gas and water. Since the viscosity of gas is about 0.02 cps. and that of liquid propane is about 0.1, the reservoir curves plotted in FIGURES 3, 6 and 7 will be shifted slightly to the right. For example, the equal velocity ratio for a water-gas mixture in reservoir C is 1.5 to 1; whereas, the equal velocity ratio for a propane-water mixture would be about 1.05 to 1.

If a slug of miscible fluid is injected into the reservoir prior to a water-gas mixture; that is, $y$ equal a positive value, then the ratio of water to gas which must be injected to maintain the size of the slug constant until breakthrough will be obtained by solving Equation 9 at various injection ratios until $x$ equal $y$. In the high pressure gas and enriched high pressure gas phase of the process, the pre-injected slug of miscible fluid will obviously be a gas at operating pressure. In the miscible slug version of the present process, one may either pre-inject a small slug of oil-soluble fluid which is liquid at the operating pressure or such a slug followed by a slug of miscible fluid which is gaseous at operating pressure. In either case, the water-to-gas mixture injected will then be the equal velocity ratio. Pre-injection of a small slug of a miscible fluid prior to a water-gas mixture at equal velocity ratio is the preferred method of operating the present invention.

Although the limits of the present invention as determined by Formula 9 are fairly broad, where equal velocity flow is desired it has been found that in most reservoirs the ratio of water to miscible fluid injected will fall between about 5 to 1 and 0.5 to 1. (See equal velocity curve F of FIGURE 3.)

The second variation of the present invention involves injecting water and miscible fluid at a ratio such that the velocity of water in the two-phase, water-gas region will be greater than the velocity of miscible fluid. In this case, we pre-inject a slug of miscible fluid prior to the injection of the water-miscible fluid mixture. The water-miscible fluid mixture to be employed can then be determined from Formula 9 by letting $y$ equal the pre-injected slug of miscible fluid and solving for $x$ equal to 0. The ratio in this variation should not be below that at which $x$ will equal 0, but it may be a ratio between $x$ equal 0 and $x$ equal $y$. At $x$ equal 0, the pre-injected slug will be completely dissipated at breakthrough; whereas, at ratios between $x$ equal 0 and $x$ equal $y$, the pre-injected slug will be partially dissipated. It should be recognized that even though a ratio of water to gas is selected at which $x$ is greater than $y$ and some water runs ahead of the mixture the benefits of the present process are not lost so long as miscible fluid remains in contact with oil and miscibility is maintained. In this case, the water ahead of the two-phase region will simply fill a portion of the pore space and act as residual water so far as the conduct of the present process is concerned. This variation is also applicable to that version of the miscible slug process in which a gas is the ultimate displacing fluid. In this case, we can pre-inject a slug of oil-soluble fluid which is liquid at the operating pressure and then inject water and gas at a ratio such that this slug will be depleted into the two-phase region just prior to breakthrough, or $x$ again will equal 0. On the other hand, one may also inject a slug of oil-soluble fluid which is liquid at the operating pressure followed by a second slug of a gas and deplete one or both of these slugs into the two-phase region. Since the reservoir curve for a two-phase, propane-water mixture differs only slightly from that for a two-phase, water-gas mixture and the amount of propane is usually very small, the overall slug of oil-soluble liquid plus gas may be treated as a single slug of gas for purposes of calculating the ratios of water-to-gas which will dissipate the slug. For this reason, the definition of a slug of miscible fluid was written to include a fluid which is gaseous at operating pressure, an oil-soluble fluid which is liquid at operating pressure or an oil-soluble fluid which is liquid at operating pressure and a fluid which is gaseous at operating pressure.

The final major variation of the present invention includes the injection of the water-miscible fluid mixture in proportions such that the miscible fluid will flow through the two-phase, water-miscible fluid region at a greater velocity than the water. In this case, miscible fluid will flow ahead of the mixture and build up a miscible fluid band ahead of the two-phase region. In applying this variation to a reservoir one can then let $y$ equal 0 and solve Equation 9 for an injection ratio at which $x$ equals the size of the band of miscible fluid desired at breakthrough. $y$ also can be a positive value, and we can add to $y$ by the injection of a ratio of water to miscible fluid at which $x$ equals the desired larger slug of miscible fluid at breakthrough. As in the previous variations, this variation may be practiced when one of the high pressure gases or enriched high pressure gas is employed or when that version of the miscible slug process in which gas is the ultimate displacing fluid is practiced. In the latter case, one may begin by injecting a mixture of water and an oil-soluble fluid which is liquid at operating pressure in a ratio such that the oil-soluble liquid will flow faster than the water and build up a band of oil-soluble liquid ahead of the two-phase region. Thereafter a mixture of water and gas at the equal velocity ratio or at a ratio which will build up a band of gas ahead of the two-phase, water-gas region would be injected. In the alternative, one may inject a small slug of oil-soluble liquid followed by a mixture of water and gas in proportions such that a band of gas will build up between the oil-soluble liquid and the two-phase, water-gas region. In both of these variations of the miscible slug process, one may also pre-inject a small volume of miscible fluid and add to the size of this slug by injecting a mixture of water and miscible fluid such that miscible fluid will flow at a velocity greater than water in the two-phase, water-miscible fluid region.

Figure 8:
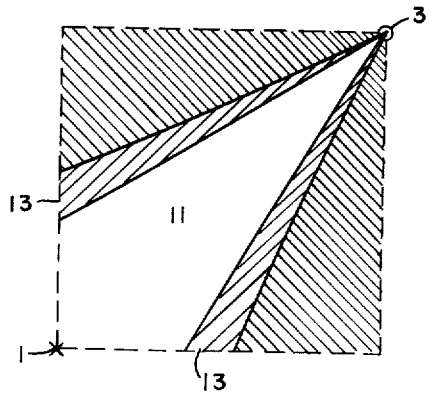
FIGURE 8 is a pictorial representation of a horizontal section of a reservoir beneath a quarter section of a five-spot injection pattern showing the volumes swept at various stages when a liquid miscible with oil and gas followed by unlimited amounts of gas has been used to displace oil.
Figure 9:
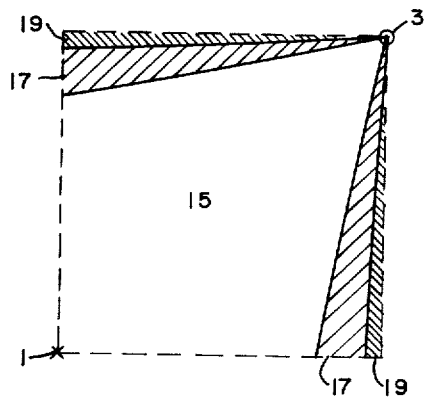
FIGURE 9 is similar to FIGURE 8 except that FIGURE 9 shows the areas swept at various stages when the present invention is practiced.

The benefits which are derived by the practice of the present invention and the limits on the size of the slug of miscible fluid which should be pre-injected or permitted to build up in the reservoir will be illustrated by reference to FIGURES 8, 9 and 10 of the drawings. FIGURES 8 and 9 are a draftsman's representation of the results obtained when various processes are practiced in an underground reservoir. These figures show a horizontal quarter section of a five-spot injection pattern. These quarter section drawings are based on laboratory experiments utilizing the X-ray shadowgraph method for determining volumetric sweepout efficiencies in oil displacement processes. In these studies, porous test plates one-fifth inch thick are made of fused Alundum. These plates when cut to correct dimensions are placed in metal holders having rubber gaskets to seal the edges. The remaining exposed surfaces are sealed with a ceramic-type glaze fused to the Alundum surface. The metal holders are fitted with appropriate fittings through which fluid may be injected and produced. The plate is first saturated with a fluid simulating reservoir formation fluids and containing an X-ray absorbing material. Thereafter, selected displacing fluids are injected, and displaced fluid is produced and analyzed. At various stages of the displacement as shown by the analysis of the fluids. X-rays are directed against the face of the plate and a shadowgraph film is exposed behind the plate in order to record the transmitted X-rays.

FIGURE 8 shows the volume of a reservoir which is swept at breakthrough and at abandonment when a small slug of oil-soluble fluid which is liquid at operating pressure is followed by unlimited amounts of a gas under pressure sufficient to maintain miscibility between the oil-soluble liquid and the gas. This is, of course, the process previously referred to as the version of the miscible slug process in which gas is the ultimate displacing fluid. It is seen from FIGURE 8 that forty percent of the reservoir volume is miscibly swept (at one hundred percent unit displacement efficiency) before the oil-soluble liquid breaks through at the producing well. This is shown by area 11. Thereafter, and until abandonment, an additional fifteen percent of the reservoir (areas 13) is partially miscibly and partially immiscibly swept at a unit displacement efficiency of about eighty percent.

In FIGURE 9 of the drawings, the process of the present invention was employed in which a slug of oil-soluble liquid is first injected, a small slug of gas is then injected under pressure sufficient to maintain the gas miscible with the oil-soluble liquid and this in turn is followed by a mixture of water and gas at the equal velocity ratio. Here it may be seen that eighty percent of the reservoir volume (area 15) was miscibly swept at one hundred percent unit displacement efficiency before the oil-soluble liquid broke through at the producing well. Thereafter, an additional fifteen percent of the reservoir (areas 17) was partially miscibly and partially immiscibly swept at a unit displacement efficiency of about eighty percent; and, finally, the remaining five percent of the reservoir (areas 19) was immiscibly swept at about fifty percent unit displacement efficiency.

Figure 10:
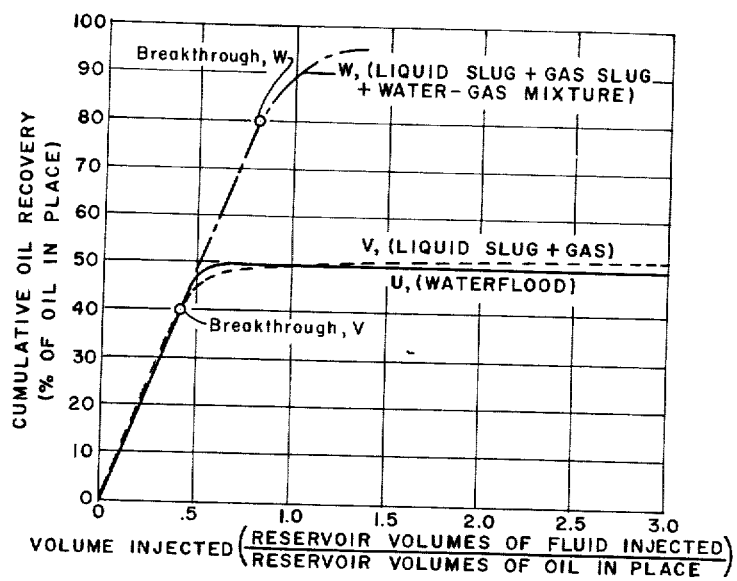
FIGURE 10 is a plot of cumulative oil production versus volume of fluid injected for a waterflood, an injection process involving a liquid miscible with oil and gas followed by unlimited amounts of gas and the process of the present invention.

FIGURE 10 is a plot of cumulative oil recovery versus volume of fluid injected for an ordinary waterflood (curve U), the version of the miscible slug process depicted in FIGURE 8 (curve V) and the process of the present invention as depicted in FIGURE 9 (curve W). FIGURE 10 shows the breakthrough recoveries for the processes shown in FIGURES 8 and 9 as well as the total recovery at abandonment.

FIGURES 8, 9 and 10 clearly show the substantial improvement which is obtained by the practice of the present invention.

In all of the variations of the process in which a slug of miscible fluid is injected prior to the injection of the water-gas mixture or a slug of miscible fluid is built up in situ, there are definite limits on the size of these slugs which should not be exceeded. If these limits are exceeded, then no benefit will be obtained by the practice of the present invention. Where a slug of miscible fluid is injected and is conventionally followed by unlimited amounts of gas in practicing the miscible slug process, it may be seen from FIGURE 10 that breakthrough occurs after forty percent of the oil has been recovered (curve V). Therefore, the total volume of the slug of miscible fluid injected prior to the water-miscible fluid mixture of the present invention should not exceed this forty percent, i.e., the volume of oil produced at breakthrough in the conventional miscible slug process. The breakthrough values indicated can be determined by well known laboratory methods. If in the practice of the miscible slug process in accordance with this invention a slug of miscible fluid is built up ahead of the water-gas mixture, in this case the size of this slug of miscible fluid should not exceed forty percent at breakthrough. For the high pressure gas process, the breakthrough volume of oil produced in conventionally practicing such high pressure gas process is about sixty-five percent. Where an enriched high pressure gas is employed as the miscible fluid and such process is carried out conventionally, the breakthrough value is somewhere between forty percent and sixty-five percent. Accordingly, where a slug of gas is to be injected prior to the water-gas mixture or a slug of gas is to be built up by the water-gas mixture in these processes such slug size should not exceed the stated values.

Since the greatest benefit will be obtained from the practice of the present invention by contacting a large volume of the reservoir as soon as possible after injection begins, it is obvious that one should pre-inject or build up the smallest slug possible within practical limits. This slug should thus be only enough to compensate for any losses which might occur due to reservoir inhomogeneities and the like and it is, therefore, preferably less than about ten percent.

As previously set forth by definition, the water-miscible fluid mixtures of the present invention may be injected as a mixture or such mixtures can be created in situ in the reservoir by injecting alternate slugs of miscible fluid and water. Obviously, a mixture cannot be created in the reservoir and the benefits of the present invention attained if a single slug of miscible fluid and a single slug of water are injected and the total volume of these two slugs exceed the volume of oil produced at breakthrough of the first increment of miscible fluid at the producing well. For example, in that version of the miscible slug process in which gas is the ultimate displacing fluid the breakthrough value is forty percent of the hydrocarbon pore volume and the total volume of a single slug of miscible fluid followed by a single slug of water should not exceed forty percent in this case. Further, in order to obtain a mixed region in the reservoir the relative volumes of miscible fluid and water would be selected such that equal velocity flow in the mixed region is attained at breakthrough. With these two factors in mind one can then determine the maximum sizes of the miscible fluid and water slugs which can be used to obtain mixing in the reservoir with reasonable accuracy by the use of Formula 9. In this case, we would let $y$ equal 0, W equal the volume of the water slug, F equal the volume of the gas slug and solve for $x$ equal 0. Since an equal velocity ratio of water to gas is the ratio which will result in $x$ equal 0 under these assumptions there is obviously no real need to use Formula 9 as a practical matter. Having the determined ratio (equal velocity ratio) one would then divide the total of the unit volumes of water and the unit volumes of gas into the breakthrough volume and obtain the maximum volumetric slug sizes one can use in the reservoir in question for the process in question. By way of specific example, if we carry out that version of the miscible slug process in which gas is the ultimate displacing fluid in reservoir C, we find that the breakthrough volume is forty percent of the hydrocarbon pore volume of the reservoir and the equal velocity ratio of water to gas is 1.5 to 1 for reservoir C. Dividing 2.5 (1.5 to 1.0) into forty percent will give us a slug volume of gas equal to sixteen percent of the hydrocarbon pore volume and a slug volume of water equal to twenty-four percent of the hydrocarbon pore volume. Similarly, if, in the example given, we have ten percent residual water present we would have a hydrocarbon pore volume of thirty-six percent $$[(1-.10)(.40)]$$

available for mixing and the equal velocity ratio of 1.22 water to 1.0 gas for reservoir C having ten percent residual water, the maximum slug volumes would then be 19.8 percent water and 16.2 percent gas. As previously stated, the slug volumes determined in this manner are the maximum values which can be employed to obtain a mixed region at breakthrough. However, smaller slug volumes can be used and should be used in order to get the maximum benefit from the increased sweep attained by the present invention.

Although a number of specific examples and modifications have been set forth above, it should be understood that other variations of the basic invention disclosed will readily be apparent to one skilled in the art. Accordingly, the present invention is limited only by the following claims.

I claim:
1. The method of increasing the recovery of oil from a subterranean reservoir having in communication therewith at least one injection well and at least one production well comprising injecting into said reservoir through said injection well and contacting said oil with a mixture of water and a fluid which is miscible with said oil and is liquid at the hereinafter specified operating pressure; the volumetric ratio of water to fluid in said water-fluid mixture being that value at which

$$W/F = \frac{S_w - S_{wr}}{S_f}$$

wherein $S_{wr}$ is the residual water saturation established during the conduct of the process, $S_w$ and $S_f$ are the water saturation and fluid saturation, respectively, established in the two-phase, water-fluid region of said reservoir and $W/F$ is the ratio of water to fluid in said water-fluid mixture; thereafter injecting into said reservoir and contacting said water-fluid mixture with a mixture of water and free gas at a pressure at which said gas is miscible with said fluid and said gas will remain in a gaseous state; the volumetric ratio of water to gas in said water-gas mixture being that value at which $$W/G = \frac{S_w - S_{wr}}{S_g}$$

wherein $S_{wr}$ is the residual water saturation established during the conduct of the process, $S_w$ and $S_g$ are the water saturation and gas saturation, respectively, established in the two-phase, water-gas region of said reservoir and $W/G$ is the ratio of water to gas in said water-gas mixture; whereby said fluid miscibly displaces said oil and said gas miscibly displaces said fluid, said water and said fluid flow through said two-phase, water-fluid region at equal velocities and said water and said gas flow through said two-phase, water-gas region at equal velocities; and withdrawing oil from said reservoir through said producing well.

2. The method of increasing the recovery of oil from a subterranean reservoir having in cmmunication therewith at least one injection well and at least one production well comprising injecting into said reservoir through said injection well and contacting said oil with a slug of miscible fluid which is miscible with said oil at the hereinafter specified operating pressure; said slug of miscible fluid being injected in an amount less than the cumulative volume of oil produced at breakthrough of the first increment of said miscible fluid at said producing well; thereafter injecting into said reservoir and contacting said miscible fluid with a mixture of water and free gas at a pressure at which said gas is miscible with said fluid; the ratio of water to gas in said water-gas mixture being such that $x$ is equal to $y$ in the formula $$x(1-S_{wr}) + S_g(1-x) = y(1-S_{wr}) + \frac{(S_w - S_{wr})(1-x)}{W/G}$$

wherein $S_{wr}$ is the residual water saturation established during the conduct of the process, $S_w$ and $S_g$ are the water saturation and gas saturation, repsectively, established in the two-phase, water-gas region of said reservoir by said injected water-gas mixture, $W/G$ is the ratio of water to gas in said injected water-gas mixture, $y$ is the volume of said slug of miscible fluid injected and $x$ is the volume of said slug of miscible fluid at breakthrough of the first increment of said miscible fluid at said producing well; whereby said fluid miscibly displaces said oil, said gas miscibly displaces said fluid and said water and said gas flow through said two-phase, water-gas region at equal velocities; and withdrawing oil from said reservoir through said producing well.

3. The method in accordance with claim 2 wherein the miscible fluid is a gas and said gas will remain in a gaseous state at the specified operating pressure.

4. The method in accordance with claim 2 wherein the miscible fluid is a liquid at the specified operating pressure.

5. The method in accordance with claim 2 wherein the miscible fluid comprises a fluid which is miscible with the oil and is liquid at the specified operating pressure and a gas which is miscible with said fluid and remains in a gaseous state at said operating pressure and said fluid and said gas are serially injected in the order specified.

6. The method of increasing the recovery of oil from a subterranean oil reservoir having in communication therewith at least one injection and at least one production well comprising injecting into said reservoir through said injection well and contacting said oil with a liquid which is miscible with said oil at about the injection pressure, said liquid being injected in an amount less than about five percent of the hydrocarbon pore volume of said reservoir; injecting into said reservoir through said injection well and contacting said liquid with a gas which is miscible with said liquid at about the injection pressure, said gas being injected in a small amount of less than about ten percent of the hydrocarbon pore volume of said reservoir; thereafter injecting into said reservoir through said injection well and displacing through said reservoir a two-phase mixture of water and gas having a water-to-gas ratio equal to about the ratio of water saturation established to gas saturation established for said reservoir in the two-phase region; and withdrawing oil from said reservoir through said production well.

7. The method of increasing the recovery of oil from a subterranean reservoir having in communication therewith at least one injection well and at least one production well comprising injecting into said reservoir and contacting said oil with a slug of miscible fluid at a pressure at which said miscible fluid is miscible with said oil; said slug of miscible fluid being injected in an amount less than the cumulative volume of oil produced at breakthrough of the first increment of said miscible fluid at said producing well; thereafter injecting into said reservoir a mixture of water and free gas at a pressure at which said gas is miscible with said fluid; the ratio of water to gas in said water-gas mixture being that value at which $x$ is a preselected value from 0 to $y$ in the formula $$x(1-S_{wr}) + S_g(1-x) = y(1-S_{wr}) + \frac{(S_w - S_{wr})(1-x)}{W/G}$$

wherein $S_{wr}$ is the residual water saturation established during the conduct of the process, $S_w$ and $S_g$ are the water saturation and gas saturation, respectively, established in the two-phase, water-gas region of said reservoir by said injected water-gas mixture, $W/G$ is the ratio of water to gas in said injected water-gas mixture, $y$ is the volume of said slug of miscible fluid injected and $x$ is the volume of said slug of miscible fluid at breakthrough of the first increment of said miscible fluid at said producing well; whereby said slug of miscible fluid miscibly displaces said oil, said gas miscibly displaces said slug of miscible fluid and a portion of said slug of miscible fluid is absorbed into a two-phase region at the leading edge of said two-phase, water-gas region; and withdrawing oil from said reservoir through said producing well.

8. The method in accordance with claim 7 wherein the miscible fluid is a gas and will remain in a gaseous state at the specified operating pressure.

9. The method in accordance with claim 7 wherein the miscible fluid is a liquid at the specified operating pressure.

10. The method in accordance with claim 7 wherein the miscible fluid comprises a fluid which is miscible with the oil and is liquid at the specified operating pressure and a gas which is miscible with said fluid and remains in a gaseous state at said operating pressure and said fluid and said gas are serially injected in the order specified.

11. The method in accordance with claim 10 wherein $x$ is a preselected value between the volume of the liquid portion of the slug of miscible fluid and $y$.

12. The method of increasing the recovery of oil from a subterranean reservoir having in communication therewith at least one injection well and at least one production well comprising injecting into said reservoir and contacting said oil with a slug of miscible fluid at a pressure at which said miscible fluid is miscible with said oil; said slug of miscible fluid being injected in an amount less than the cumulative volume of oil produced at breakthrough of the first increment of said miscible fluid at said producing well; thereafter injecting into said reservoir and contacting said slug of miscible fluid with a mixture of water and gas; the ratio of water to gas in said injected water-gas mixture being that value at which $x$ is a preselected value between $y$ and said cumulative volume of oil produced at breakthrough in the formula $$x(1-S_{wr}) + S_g(1-x) = y(1-S_{wr}) - \frac{(S_w - S_{wr})(1-x)}{W/G}$$

wherein $S_{wr}$ is the residual water saturation established during the conduct of the process, $S_w$ and $S_g$ are the water saturation and gas saturation, respectively, established in the two-phase, water-gas region of said reservoir by the injected water-gas mixture, $W/G$ is the ratio of water to gas in said injected water-gas mixture, $y$ is the volume of said slug of miscible fluid injected and $x$ is the volume of said slug of miscible fluid and gas at breakthrough of the first increment of said miscible fluid at said producing well; whereby said slug of miscible fluid miscibly displaces said oil and a portion of said gas is emitted from said two-phase, water-gas region at the leading edge of said region and adds to the volume of said slug of miscible fluid; and withdrawing oil from said reservoir through said producing well.

13. The method in accordance with claim 12 wherein the slug of miscible fluid is a gas and remains in a gaseous state at the specified operating pressure.

14. The method in accordance with claim 12 wherein the slug of miscible fluid is a liquid at the specified operating pressure.

15. The method in accordance with claim 12 wherein a first portion of the slug of miscible fluid is a fluid which is miscible with the oil and is liquid at the specified operating pressure and the remaining portion of said slug of miscible fluid is a gas which is miscible with said liquid and remains in a gaseous state at said operating pressure, serially injected in that order.

16. The method of increasing the recovery of oil from a subterranean reservoir having in communication therewith at least one injection well and at least one production well comprising injecting into said reservoir through said injection well and contacting said oil with a slug of miscible fluid which is miscible with said oil and is liquid at the hereinafter specified operating pressure; said slug of miscible fluid being injected in an amount less than the cumulative volume of oil produced at breakthrough of the first increment of said miscible fluid at said producing well; thereafter injecting into said reservoir and contacting said liquid with a mixture of water and free gas at a pressure at which said gas is miscible with said liquid and remains in a gaseous state; the ratio of water to gas in said water-gas mixture being that value at which $x$ is less than said cumulative volume of oil produced at breakthrough minus the volume of said injected slug of miscible fluid in the formula $$x(1-S_{wr})+S_g(1-x)=\frac{(S_w-S_{wr})(1-x)}{W/G}$$

wherein $S_{wr}$ is the residual water saturation established during the conduct of the process, $S_w$ and $S_g$ are the water saturation and gas saturation, respectively, established in the two-phase, water-gas region of said reservoir, $W/G$ is the ratio of water to gas in said injected water-gas mixture and $x$ is the volume of the hereinafter-mentioned slug of gas at breakthrough of the first increment of said miscible fluid at said producing well; whereby said slug of miscible fluid miscibly displaces said oil, a portion of said gas is emitted from said two-phase, water-gas region and builds up a slug of gas between said slug of miscible fluid and said two-phase, water-gas region and said slug of gas miscibly displaces said slug of miscible fluid; and withdrawing oil from said reservoir through said production well.

17. The method of increasing the recovery of oil from a subterranean reservoir having in communication therewith at least one injection well and at least one production well comprising injecting into said reservoir through said injection well and contacting said oil with a liquid which is miscible with said oil at about the injection pressure, said liquid being injected in an amount less than about five percent of the hydrocarbon pore volume of said reservoir; thereafter injecting into said reservoir through said injection well and displacing through said reservoir a two-phase mixture of water and gas having a water-to-gas ratio less than the ratio of water saturation established to gas saturation established for said reservoir in the two-phase region but greater than a water-to-gas ratio of 0.5, whereby a small amount of said gas is emitted from said two-phase mixture at the leading edge of said mixture; and withdrawing oil from said reservoir through said production well.

18. The method of increasing the recovery of oil from a subterranean reservoir having in communication therewith at least one injection well and at least one production well comprising injecting into said reservoir through said injection well and contacting said oil with a mixture of water and gas at a pressure at which said gas is miscible with said oil; the volumetric ratio of water to gas in said water-gas mixture being that value at which $$\frac{W}{G}=\frac{S_w-S_{wr}}{S_g}$$

wherein $S_{wr}$ is the residual water saturation established during the conduct of the process, $S_w$ and $S_g$ are the water saturation and gas saturation, respectively, established in the two-phase, water-gas region of said reservoir by the injected water-gas mixture and $W/G$ is the ratio of water to gas in said injected water-gas mixture; whereby said water and said gas flow through said two-phase, water-gas region at equal velocities and said gas miscibly displaces said oil; and withdrawing oil from said reservoir through said producing well.

19. The method of increasing the recovery of oil from a subterranean reservoir having in communication therewith at least one injection well and at least one production well comprising injecting into said reservoir through said injection well and contacting said oil with a mixture of water and gas at a pressure at which said gas is miscible with said oil; the ratio of water to gas in said water-gas mixture being that value at which $x$ is a preselected value less than the cumulative volume of oil produced at breakthrough of the first increment of said gas at said production well in the formula $$x(1-S_{wr})+S_g(1-x)=\frac{(S_w-S_{wr})(1-x)}{W/G}$$

wherein $S_{wr}$ is the residual water saturation established during the conduct of the process, $S_w$ and $S_g$ are the water saturation and gas saturation, respectively, established in the two-phase, water-gas region of said reservoir, $W/G$ is the ratio of water to gas in said injected water-gas mixture and $x$ is the volume of the hereinafter mentioned slug of gas at breakthrough of the first increment of said gas in said producing well; whereby a portion of said gas is emitted from said two-phase, water-gas region at the leading edge of said region and builds up a slug of gas ahead of said two-phase, water-gas region; and withdrawing oil from said reservoir through said production well.

20. The method in accordance with claim 19 wherein the injection of said mixture of water and gas is preceded by the injection of a mixture of water and a miscible fluid which is a liquid at the specified operating pressure and is miscible with the reservoir oil and the gas.

References Cited in the file of this patent

UNITED STATES PATENTS

| | | |
|---|---|---|
| 1,511,067 | Russell | Oct. 7, 1924 |
| 1,658,305 | Russell | Feb. 7, 1928 |
| 2,669,306 | Teter et al. | Feb. 16, 1954 |
| 2,724,437 | Whorton et al. | Nov. 22, 1955 |
| 2,968,350 | Slobod et al. | Jan. 17, 1961 |

FOREIGN PATENTS

| | | |
|---|---|---|
| 696,524 | Great Britain | Sept. 2, 1953 |

OTHER REFERENCES

Torrey; The Petroleum Engineer, "New and Suggested Techniques for Improving the Recovery of Oil," Reference Annual, 1951, page E-14.

UNITED STATES PATENT OFFICE
CERTIFICATE OF CORRECTION

Patent No. 3,096,821                                        July 9, 1963

Alvin B. Dyes

It is hereby certified that error appears in the above numbered patent requiring correction and that the said Letters Patent should read as corrected below.

Column 3, line 4, for "my" read -- by --; column 7, line 58, in equation (5), for "Volocity" read -- Velocity --; column 8, line 34, for "were" read -- where --; column 9, line 32, for "forthy" read -- forty --; line 52, for "as" read -- a --; column 14, line 7, for "fluids." read -- fluids, --; column 16, line 55, for "cmmunication" read -- communication --; line 75, for "repsectively" read -- respectively --.

Signed and sealed this 31st day of March 1964.

(SEAL)
Attest:
ERNEST W. SWIDER

EDWARD J. BRENNER

Attesting Officer                                       Commissioner of Patents